United States Patent
Chopra et al.

(10) Patent No.: US 10,757,188 B1
(45) Date of Patent: Aug. 25, 2020

(54) SYSTEM AND METHOD FOR EFFICIENT DATA ACCESS FOR RESTORES

(71) Applicant: EMC IP Holding Company LLC, Hopkinton, MA (US)

(72) Inventors: Shelesh Chopra, Bangalore (IN); Gururaj Kulkarni, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/866,555

(22) Filed: Jan. 10, 2018

(51) Int. Cl.
*H04L 29/08* (2006.01)

(52) U.S. Cl.
CPC ........ *H04L 67/1097* (2013.01); *H04L 67/101* (2013.01); *H04L 67/1031* (2013.01)

(58) Field of Classification Search
None
See application file for complete search history.

(56) References Cited

U.S. PATENT DOCUMENTS

| | | | |
|---|---|---|---|
| 8,554,918 B1 | 10/2013 | Douglis | |
| 9,098,525 B1 | 8/2015 | Mandic et al. | |
| 9,330,109 B2 | 5/2016 | Bone et al. | |
| 9,451,013 B1 | 9/2016 | Roth | |
| 9,531,809 B1 * | 12/2016 | Brooker | G06F 16/182 |
| 9,740,435 B2 * | 8/2017 | Dolce | G06F 3/0605 |
| 9,953,075 B1 | 4/2018 | Reiner et al. | |
| 9,977,704 B1 | 5/2018 | Chopra et al. | |
| 10,089,148 B1 | 10/2018 | Blitzer et al. | |
| 10,180,912 B1 | 1/2019 | Franklin et al. | |
| 2005/0033756 A1 | 2/2005 | Kottomtharayil et al. | |
| 2006/0224852 A1 | 10/2006 | Kottomtharayil | |
| 2009/0260021 A1 | 10/2009 | Haenel | |
| 2011/0137870 A1 * | 6/2011 | Feder | G06F 16/174 707/662 |
| 2011/0314069 A1 | 12/2011 | Alatorre et al. | |
| 2012/0059934 A1 | 3/2012 | Rafiq et al. | |
| 2012/0278569 A1 | 11/2012 | Kawakami et al. | |
| 2012/0331248 A1 | 12/2012 | Kono et al. | |
| 2013/0138649 A1 * | 5/2013 | Broberg | H04L 67/06 707/736 |
| 2013/0290627 A1 | 10/2013 | Nazari et al. | |

(Continued)

FOREIGN PATENT DOCUMENTS

WO 01/06368 A1 1/2001

OTHER PUBLICATIONS

European Extended Search Report issued in corresponding EP application 19150826.6 (8 pages).

(Continued)

*Primary Examiner* — Joshua Joo
(74) *Attorney, Agent, or Firm* — Chamberlain, Hrdlicka, White, Williams & Aughtry

(57) ABSTRACT

A storage gateway for providing stored data includes a persistent storage and a processor. The persistent storage includes a stored data map. The processor obtains a data storage access request from a client, identifies a data fragment specified by the data storage access request, identifies storages that each store a copy of the data fragment using the stored data map, selects a storage of the storages based on connection characteristics between the storages and the client when the data storage access request is obtained, and obtains the copy of the data fragment from the selected storage of the storages.

18 Claims, 14 Drawing Sheets

(56) References Cited

U.S. PATENT DOCUMENTS

| | | |
|---|---|---|
| 2014/0082167 A1 | 3/2014 | Robinson |
| 2014/0281301 A1 | 9/2014 | Reinoso et al. |
| 2014/0297950 A1* | 10/2014 | Kuwayama ........... G06F 3/0617 711/114 |
| 2014/0380014 A1 | 12/2014 | Moyer |
| 2015/0154418 A1 | 6/2015 | Redberg |
| 2015/0205528 A1 | 7/2015 | Hyde, II et al. |
| 2015/0261468 A1* | 9/2015 | Khoyi ..................... G06F 11/00 711/114 |
| 2016/0054922 A1 | 2/2016 | Awasthi et al. |
| 2016/0062779 A1 | 3/2016 | Tsirkin |
| 2016/0062795 A1 | 3/2016 | Hu et al. |
| 2016/0085574 A1 | 3/2016 | Dornemann et al. |
| 2017/0060695 A1 | 3/2017 | Clare |
| 2017/0093976 A1* | 3/2017 | Raghunath .......... H04L 67/1097 |
| 2017/0168729 A1 | 6/2017 | Faulkner et al. |
| 2017/0302555 A1* | 10/2017 | Weinman .............. H04L 47/125 |
| 2017/0351426 A1* | 12/2017 | Anderson ............... G06F 3/061 |
| 2018/0188989 A1* | 7/2018 | Nachimuthu ......... G06F 3/0632 |
| 2018/0267830 A1 | 9/2018 | Rivera et al. |
| 2018/0314429 A1* | 11/2018 | Thomas ................ G06F 3/0605 |
| 2019/0235922 A1 | 8/2019 | Iovanna et al. |
| 2019/0245794 A1* | 8/2019 | Kalman .................. G06F 3/061 |

OTHER PUBLICATIONS

European Extended Search Report issued in corresponding European Application No. 19169657.4, dated Nov. 27, 2019.

Gregory Collier et al.; "Virtualization's Next Frontier: Security"; In Proceedings of the 35th Annual ACM SIGUCCS Fall Conference (SIGUCCS '07); pp. 34-36; 2007.

* cited by examiner

SYSTEM AND METHOD FOR EFFICIENT DATA ACCESS FOR RESTORES

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, a storage gateway for providing stored data in accordance with one or more embodiments of the invention includes a persistent storage and a processor. The persistent storage includes a stored data map. The processor obtains a data storage access request from a client, identifies a data fragment specified by the data storage access request, identifies storages that each store a copy of the data fragment using the stored data map, selects a storage of the storages based on connection characteristics between the storages and the client when the data storage access request is obtained, and obtains the copy of the data fragment from the selected storage of the storages.

In one aspect, a method of operating a storage gateway for providing stored data in accordance with one or more embodiments of the invention includes obtaining a data storage access request from a client. The method includes identifying a data fragment specified by the data storage access request. The method includes identifying storages that each store a copy of the data fragment using the stored data map. The method includes selecting a storage of the storages based on connection characteristics between the storages and the client when the data storage access request is obtained. The method includes obtaining the copy of the data fragment from the selected storage of the storages.

In one aspect, a non-transitory computer readable medium in accordance with one or more embodiments of the invention includes computer readable program code, which when executed by a computer processor enables the computer processor to perform a method for operating a storage gateway for providing stored data. The method includes obtaining a data storage access request from a client. The method includes identifying a data fragment specified by the data storage access request. The method includes identifying storages that each store a copy of the data fragment using the stored data map. The method includes selecting a storage of the storages based on connection characteristics between the storages and the client when the data storage access request is obtained. The method includes obtaining the copy of the data fragment from the selected storage of the storages.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
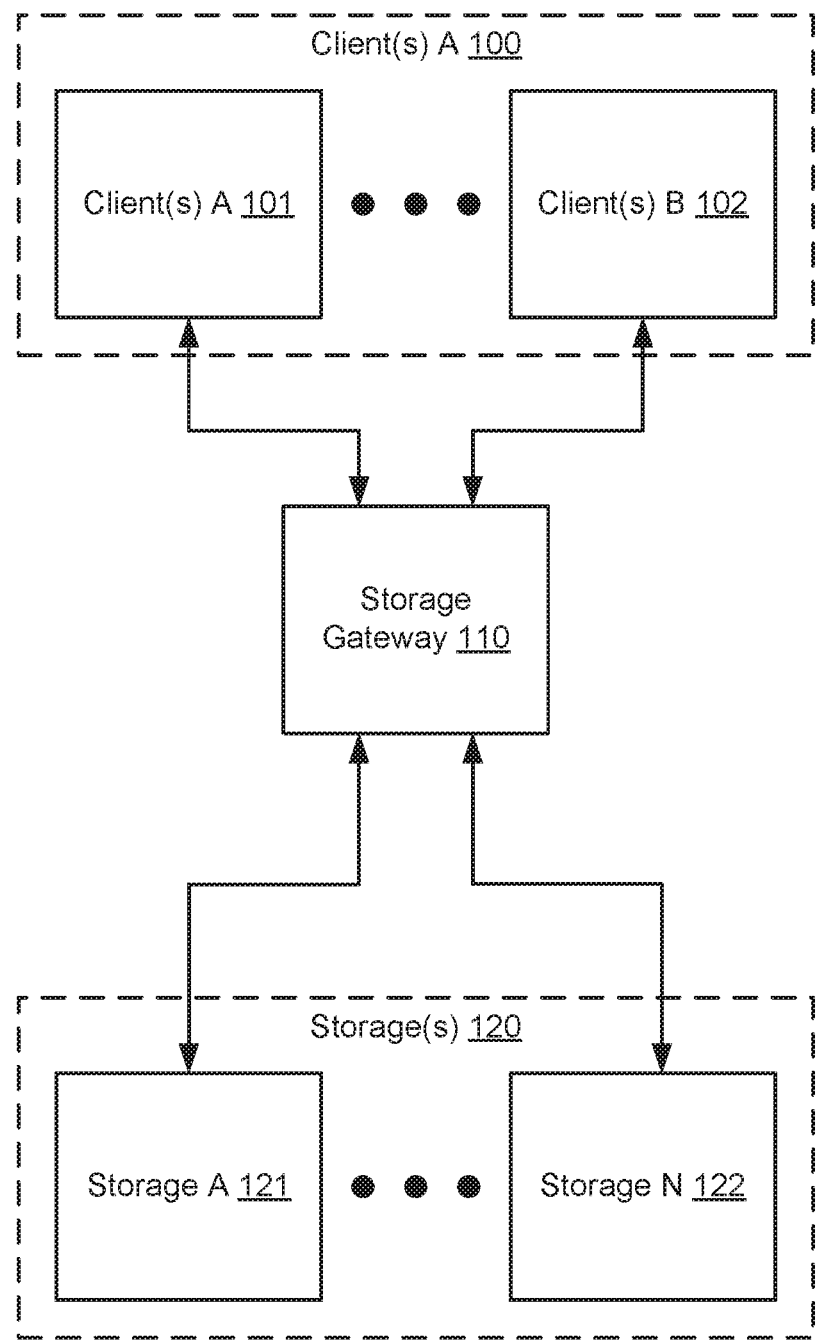
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. More specifically, the systems, devices, and methods may store data from clients in a number of storages to improve reliability of the stored data and/or decrease the computing resource cost of storing the data. For example, data from a client may first be stored in a high performance storage. Over time, copies of the data may be stored in any number of lower performance storages at various geographic locations. Storing copies of the data at varying geographic locations may improve the reliability of the data by reducing the likelihood that a single natural disaster would wipe out all copies of the stored data. Additionally, storing the copies of the data in lower performance storages may reduce the consumption of computing resources to store the data.

In one or more embodiments of the invention, at least one of the storages in which the copies of the data are stored is not present or otherwise available at the time the data is originally stored. In other words, storages may be added after data is initially stored and copies of the data may be stored in the added storages over time. For example, data from clients may be required to be stored for several years. Over the storage time, new storages may be added to the system and older, existing storages may be removed from the system. Accordingly, when client data is stored it is not possible to plan out the entire storage life of the client data throughout the system. This is advantageous in that it enables newer, higher performance or lower cost storages to be added to the system and the previously stored data may be advantageously stored in the added storages. However, a plan for obtaining the client data stored in the system at any time in the future at the time the client data is stored because the future storage plan for the client data is not definite.

In one or more embodiments of the invention, when stored client data is requested by a client the system identifies a storage to provide the data. The identified storage may not be the storage in which the original data was stored. In other words, the system may facilitate providing the client data by obtaining a copy of the client data from storages that were not present at the time the client data was stored. For example, the system may dynamically determine the location where copies of the requested client data is located within the system at the time the data access request is obtained and select one of the determined storage locations to provide the data to service the data access request.

In one or more embodiments of the invention, the system may characterize the computing resource cost of providing stored client data via a number of storages storing copies of the client data. The system may provide the data using a storage selected based on the characterized computing resource cost. By providing the requested data based on the characterization the computing resource cost of providing the data may be decreased, the responsiveness of the system may be improved, and/or a user experience (i.e., the client requesting the data) may be improved by providing the client data more efficiently. The system may provide other, different, additional, or fewer advantages over conventional approaches to providing client data without departing from the invention.

As used herein, computing resources refer to processor cycles, communication bandwidth, transitory storage input-output cycles, persistent storage input-output cycles, and/or transitory or persistent memory storage capacity. Transitory storage may be provided by, for example, random access memory. Persistent storage memory may be provided by, for example, a solid state hard disk drive. Processor computing cycles may be provided by, for example, a central processing unit. Communication bandwidth may be provided by, for example, a network interface card. A computing resource cost refers to the amount or magnitude of the used computing resources to accomplish a task. The task may be, for example, providing data from clients using copies of the data stored in one or more storages.

FIG. 1A shows an example system in accordance with one or more embodiments of the invention. The system may include client(s) (100) that store data in storages (120) via a storage gateway (110) that manages storing of the client data in the storages (120). Storages (121, 122) may be dynamically added or removed over time resulting in data, or copies thereof, stored in the storages being migrated to different storages over time. The storage gateway (110) may service data access requests from clients by characterizing the computing resource cost of providing the requested data from multiple storages of the storages (120) and then providing the requested data from one of the storages based on the characterization. In other words, the storage gateway (110) may select a storage to provide stored data rather than other storages that could also provide the data but would do so at a higher computing resource consumption cost than the selected storage. The clients (100), storage gateway (110), and storages (120) may be operably connected to each other. The connection may be, for example, a network connection. Each component of the system is discussed below.

The clients (100) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (100) may be other types of computing devices without departing from the invention.

The clients (100) may be programmed to store data in the storages (120) via the storage gateway (110). By storing data in the storages (120), the clients (100) may store backup copies of data and/or reduce the storage utilization rate of the clients, e.g., utilize the storages (120) as a remote storage.

In one or more embodiments of the invention, the clients (100) store a copy of all or a portion of the respective client's data in the storages (120) via the storage gateway (110). In other words, the storage gateway (110) may be used to back up the client's data.

In one or more embodiments of the invention, the clients (100) store data in the storages (120) via the storage gateway (110). In other words, rather than storing data to a local storage, the clients (100) may store data in the storages (120) via the storage gateway (110) without making a local copy of the stored data.

While the clients (102, 104) are illustrated as being assigned to a single storage gateway (110), multiple groupings of clients may be assigned to any number of storage gateways without departing from the invention. Additionally, while the storage gateway (110) is illustrated as being operably connected/use all storages (120), the storage gateway (110) may only be operably connected/use a portion of the storages (120) without departing from the invention. For example, a system may include two groupings of clients, each grouping may be serviced by separate storage gateways, and each storage gateway may utilize different storages to store data. Further, in some embodiments of the invention, different storage gateways may utilizes different groupings of storages that share one or more storages between the storage groupings.

To facilitate managing data from the clients, the storage gateway (110) may store the client data in the storages (120). The storages (120) may be computing devices. The computing devices may be, for example, mobile phones, tablet computers, laptop computers, desktop computers, servers, distributed computing systems, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The storages (120) may be other types of computing devices without departing from the invention.

In one or more embodiments of the invention, the storages (120) may be distributed computing devices. As used herein, a distributed computing device refers to functionality provided by a logical device that utilizes the computing resources of one or more separate and/or distinct computing devices. For example, in one or more embodiments of the invention, the storages (120) may be a distributed devices that include components distributed across a number of separate and/or distinct computing devices. In such a scenario, the functionality of the storages (120) may be performed by multiple different computing devices without departing from the invention.

The storages (120) may store client data or provide previously stored client data. The storages (120) may store or provide client data in response to requests from the storage gateways (110). In response to the requests, the storages (120) may take appropriate action to service the aforementioned storage/access requests from the storage gateways. The storages (120) may also store copies of previously stored client data for data security purposes. For example, copies of client data stored in a first storage may be replicated in a second storage. Additionally, different storages may have different performance characteristics and/or connection characteristics that impact the quality of storage services provided by the storages. For example, different storages may be connected to clients using different connections that have different bandwidth limitations. For additional details regarding the storages (120), See FIG. 1C.

While the storages (121, 122) are illustrated as being operably connected to a single storage gateway (110), the storages storage may be operably connected to any number and/or combination of storage gateways without departing from the invention. In other words, storages (120) may provide storage services for any number of storage gateways. For example, a system contemplated herein may include multiple storage gateways that each provides storage services to groups of clients. The groups may be different groups of clients or partially different groups of clients (e.g., different groups of clients that have some clients as members of both groups).

As discussed above, the clients (100) may store data in the storages (120) via the storage gateway (110). The storage gateway (110) may be a computing device. The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and the methods illustrated in FIGS. 4A-5. The storage gateway (110) may be other types of computing devices without departing from the invention.

In one or more embodiments of the invention, the storage gateway (110) may be a distributed computing device. As used herein, a distributed computing device refers to functionality provided by a logical device that utilizes the computing resources of one or more separate and/or distinct computing devices. For example, in one or more embodiments of the invention, the storage gateway (110) may be a distributed device that includes components distributed across a number of separate and/or distinct computing devices. In such a scenario, the functionality of the storage gateway (110) may be performed by multiple different computing devices without departing from the invention.

The storage gateway (110) may manage client data. The storage gateway (110) may manage client data by receiving requests to store or provide data from or to the clients (100). In response to the requests, the storage gateway (110) may take appropriate action to service the aforementioned data storage/access requests from the clients. When selecting a storage from which to obtain client data, the storage gateway (110) may evaluate a computing resource cost of obtaining the data from multiple storages that each store a copy of the client data. Based on the evaluation, the storage gateway (110) may select a storage from which to obtain a copy of the client data. Once obtained, the storage gateway (110) may provide the data to the client that sent the request or another recipient. As discussed above, since data is dynamically migrated between storages over time, it is not possible to determine where, i.e., the storage storing copies of the data, the data will be stored within the system when the data is requested. Performing an evaluation of the computing resource cost of providing the data from varying sources at the time the data is requested may reduce the overall computing resource cost of providing data. Performing the evaluation may increase the individual transaction computing resource cost of providing data because an initial calculation must be performed before the data is provided. For additional details regarding the storage gateway (110), See FIG. 1B.

Figure 1B:
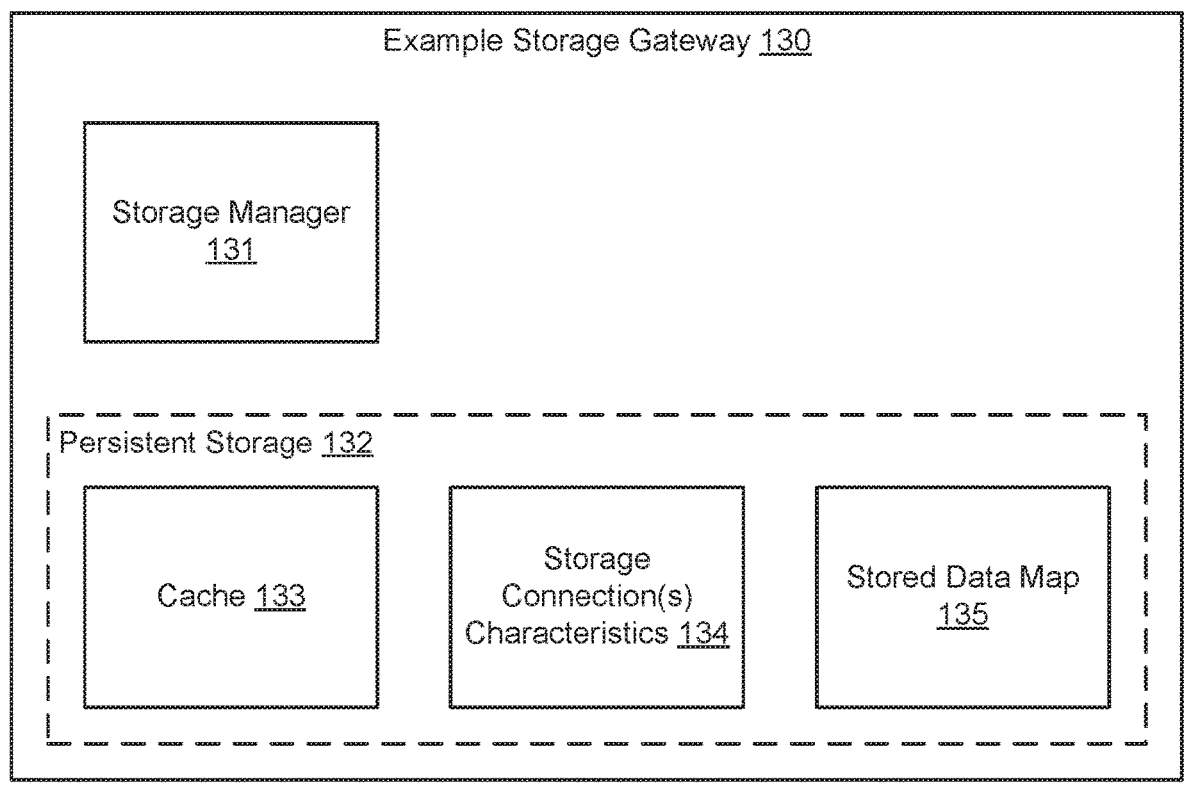
FIG. 1B shows a diagram of an example storage gateway in accordance with one or more embodiments of the invention.
Figure 1C:
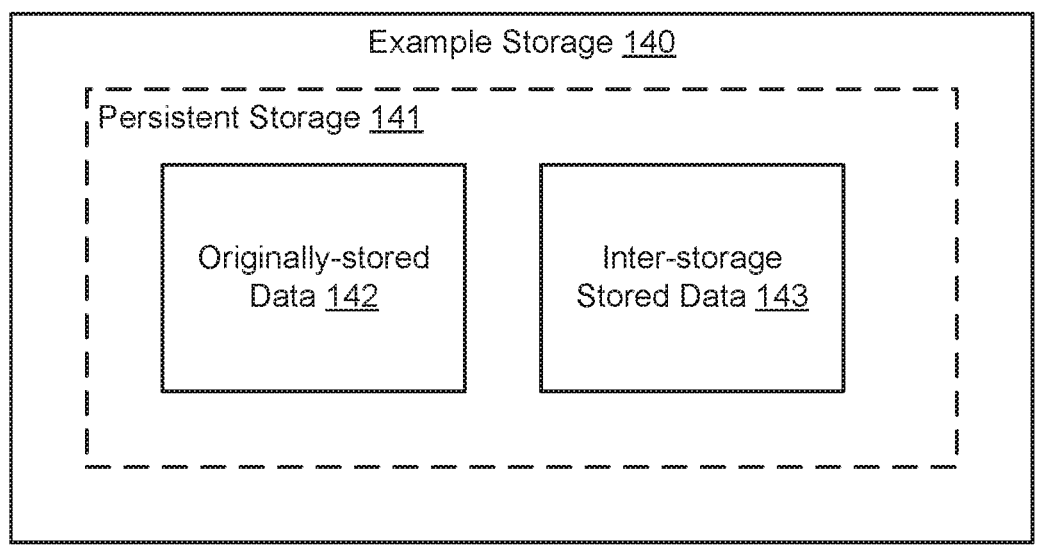
FIG. 1C shows a diagram of an example storage in accordance with one or more embodiments of the invention.

To further explain embodiments of the invention, an example storage gateway (130) and an example storage (140) are illustrated in FIGS. 1B and 1C, respectively.

FIG. 1B shows an example storage gateway (130) in accordance with one or more embodiments of the invention. To provide the functionality of the storage gateway described with respect to FIG. 1A, the example storage gateway (130) may include a storage manager (131) that: (i) stores and obtains client data from storages and (ii) replicates and migrates stored data to meet quality of service requirements. The example storage gateway (130) may also include a persistent storage (132) for storing data. Each component of the example storage gateway (130) is discussed below.

In one or more embodiments of the invention, the storage manager (131) services data storage/access requests from clients. To service the requests, the storage manager (131) may perform the methods illustrated in FIGS. 4A-5. The storage manager (131) may service storage/access requests using other methods without departing from the invention.

In one or more embodiments of the invention, the cache (133) may store copies of a portion of the client data stored in the storages. The storage manager (131) may preferentially retrieve copies of client data stored in the cache (133)

when servicing client request rather than retrieving copies of the client data stored in the storages.

In one or more embodiments of the invention, the storage manager (131) may be implemented as a circuit. For example, storage manager (131) may be implemented as a field programmable gate array, application integrated circuit, digital signal processor, or analog circuit. The storage manager (131) may be implemented as other types of circuit without departing from the invention.

In one or more embodiments of the invention, the storage manager (131) may be implemented as computer readable instructions stored on a non-transitory computer readable storage medium being executed by a processor. The computer readable instructions may cause the processor to perform the aforementioned functions of the storage manager (131).

In one or more embodiments of the invention, the persistent storage (132) is a physical device. The physical device may be, for example, a solid state hard drive, a disk drive, a tape drive, or other non-transitory storage medium. In some embodiments of the invention, the persistent storage (132) is a logical device that utilizes the physical computing resources of one or more other devices to provide data storage functionality. For example, the persistent storage (132) may be a logical storage that utilizes the physical storage capacity of disk drives of multiple, separate computing devices.

The persistent storage (132) may store a cache (133), storage connection characteristics (134), and/or a stored data map (135). The persistent storage (132) may store additional, different, or less data without departing from the invention. The example storage gateway (130) may utilize the aforementioned stored data when performing the methods illustrated in FIGS. 4A-5.

In one or more embodiments of the invention, the cache (133) is a data structure stored in the persistent storage (132). The data structure may include copies of client data stored in the storages. In some cases, client data may be first stored in the cache (133) and copies of the client data may be subsequently stored in the storages. Portions of the client data in the cache (133) may be deleted and thereby result in a copy of only a portion of a client's data stored in the storages being maintained in the cache (133).

In one or more embodiments of the invention, the storage connections characteristics (134) include information regarding a state/quality of the connection between a client, a storage gateway, and/or a storage. The data structure may include information used by the storage manager (131) when selecting from which storage to obtain previously stored client data to service data access requests from clients. For additional details regarding the storage connection characteristics (134), See FIG. 2B.

In one or more embodiments of the invention, the stored data map (135) includes information regarding which storages store copies of client data. The data structure may include information used by the storage manager (131) when selecting from which storage to obtain previously stored client data to service data access requests from clients. For additional details regarding the stored data map (135), See FIG. 2B.

FIG. 1C shows an example storage (140) in accordance with one or more embodiments of the invention. The example storage (140) may store data from storage gateways or provide stored data to storage gateways in response to requests from the storage gateways.

In one or more embodiments of the invention, the example storage (140) includes a persistent storage (141).

The persistent storage (141) may be a physical device. The physical device may be, for example, a solid state hard drive, a disk drive, a tape drive, or other non-transitory storage medium. In some embodiments of the invention, the persistent storage (141) may be a logical device that utilizes the physical computing resources of one or more other devices to provide data storage functionality. For example, the persistent storage (141) may be a logical storage that utilizes the physical storage capacity of disk drives of multiple, separate computing devices.

In one or more embodiments of the invention, the persistent storage (141) stores originally-stored data (142) and inter-storage stored data (143). The originally-stored data (142) may be data that is stored to the example storage (140) by a storage gateway in response to a client storage request. In other words, the originally-stored data (142) may be the first storage of the data to any storage. In contrast, the inter-storage stored data (143) may be data that is replicated or migrated from another storage. In other words, the inter-storage stored data (143) may a second or tertiary storage of originally-stored data (142).

In one or more embodiments of the invention, the inter-storage stored data (143) is stored by a storage gateway or other entity to improve the reliability of client data managed by a storage gateway. For example, the inter-storage stored data (143) may be a copy of client data that is also stored by any number of other storages.

In one or more embodiments of the invention, the inter-storage stored data (143) is stored by a storage gateway or other entity to reduce the computing resources used to store the data. For example, the inter-storage stored data (143) may be migrated from a high performance storage to a high efficiency storage.

The originally-stored data (142) and inter-storage stored data (143) may include data of any format and/or combination of formats. For example, the aforementioned data may include text file, audio visual file, database files, and/or unstructured data. The data may include other types of data without departing from the invention.

In one or more embodiments of the invention, the originally-stored data (142) and/or inter-storage stored data (143) may be deduplicated before storage in the persistent storage (141). In other words, the originally-stored data (142) and/or inter-storage stored data (143) may be deduplicated other data stored in the persistent storage (141) before being stored in the persistent storage (141).

As used herein, deduplication refers to a process that attempts to reduce the required amount of storage space used to store data by not storing multiple copies of the same files or bit patterns. Deduplication balances the input-output (IO) limits of the physical devices used to store data against the benefit of reduced storage space requirements by only comparing the to-be-stored data to a portion of all of the data stored in the location where the to-be-stored data will be stored.

To deduplicate data, the to-be-stored data may be broken down into segments. The segments may correspond to portions of the to-be-stored data. Fingerprints that identify each segment of the to-be-stored data may be generated. The generated fingerprints may be compared to a portion of pre-existing fingerprints associated with a portion of the data already stored in the storage. Any segments of the to-be-stored data that do not match a fingerprint of the portion of the data already stored in the storage may be stored in the storage, the other segments are not stored in the storage. A file recipe to generate the now-stored data may be generated and stored so that the now-stored data may be retrieved from the storage. The recipe may include information that enables all of the segments of the to-be-stored data that were stored in the storage and all of the segments of the data already stored in the object storage having fingerprints that matched the fingerprints of the segments of the to-be-stored data to be retrieved from the object storage.

As used herein, a fingerprint may be a bit sequence that virtually uniquely identifies a segment. As used herein, virtually uniquely means that the probability of collision between each fingerprint of two segments that include different data is negligible, compared to the probability of other unavoidable causes of fatal errors. In one or more embodiments of the invention, the probability is $10^{\wedge}$-20 or less. In one or more embodiments of the invention, the unavoidable fatal error may be caused by a force of nature such as, for example, a tornado. In other words, the fingerprint of any two segments that specify different data will virtually always be different.

In one or more embodiments of the invention, a fingerprint of a bit sequence is generated by obtaining a hash of the bit sequence. The hash may be generated using, for example, secure hashing algorithm (SHA) 1. Other hashing algorithms may be used without departing from the invention.

The process of deduplication of data, discussed above, utilizes computing resources including processing cycles, storage IO, and/or network communications bandwidth. Multiple clients may attempt to concurrently store data and thereby consume all available computing resources resulting in a reduced quality of service offered by the storage device which, in turn, reduces the quality of service provided by storage gateways to clients. Embodiments of the invention may improve the quality of storage service by proactively identifying storages that: (i) store a copy of requested data and (ii) are not computing resource or communication bandwidth limited.

Figure 1D:
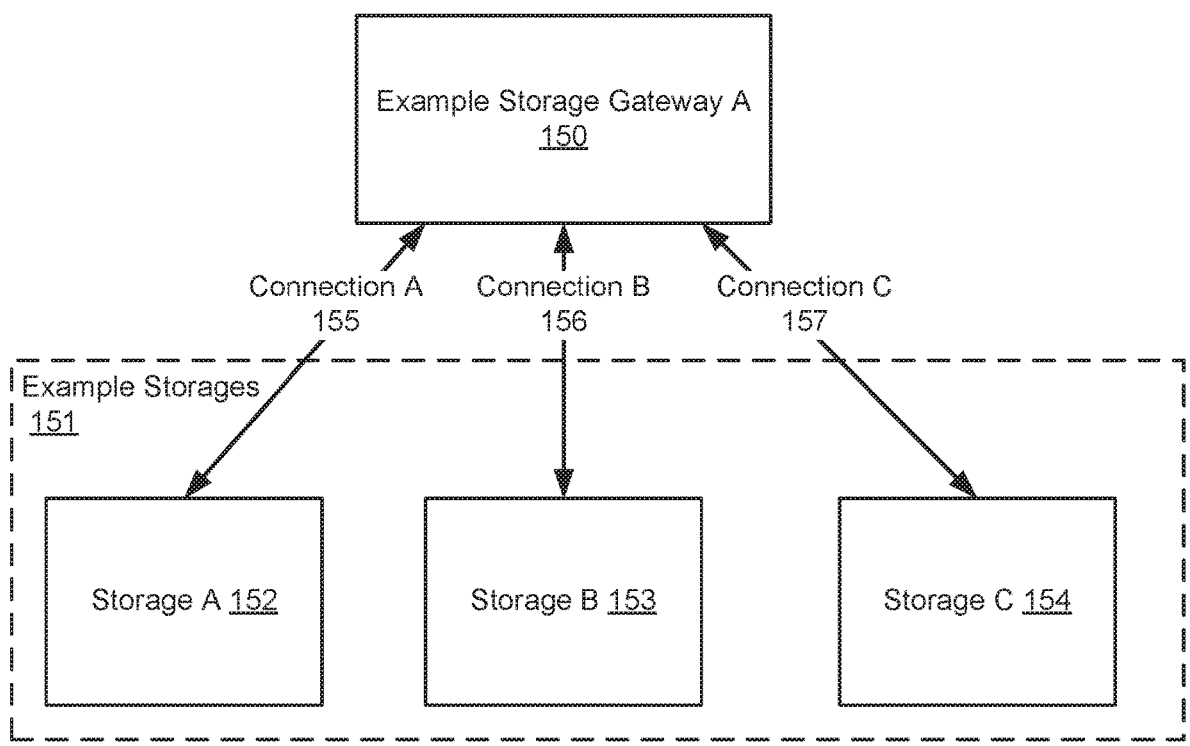
FIG. 1D shows a diagram of an example storage topology in accordance with one or more embodiments of the invention.

As discussed above, to service client storage/access requests the storage gateway may utilize storages. The storages may be separate devices operably connected to the storage gateway. The storage gateway may be connected to any number of storages. FIG. 1D shows an example of a storage gateway and storage topology.

FIG. 1D shows a diagram of an example storage topology. The example storage topology includes a storage gateway A (150) operably connected to storages (152, 153, 154) through respective operable connections (155, 156, 157). Each of the operable connections may have different limitations, e.g., bandwidth or latency, and each storage (152, 153, 154) may have different available computing resources. The storage gateway A (150) may select a storage from which to obtain client data based on the connection limitations and available computing resources.

Figure 2A:
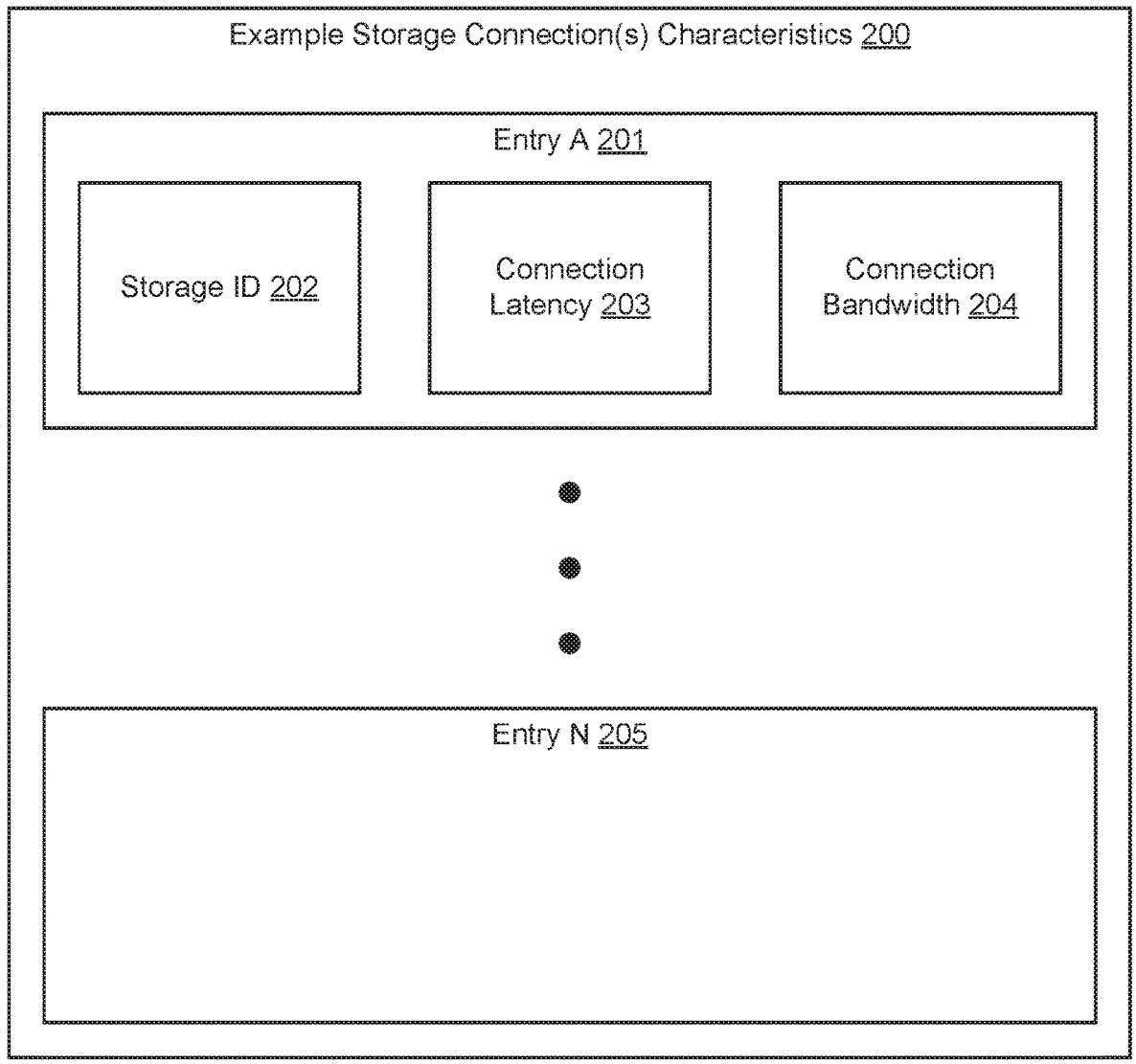
FIG. 2A shows a diagram of an example of storage connection characteristics in accordance with one or more embodiments of the invention.
Figure 2B:
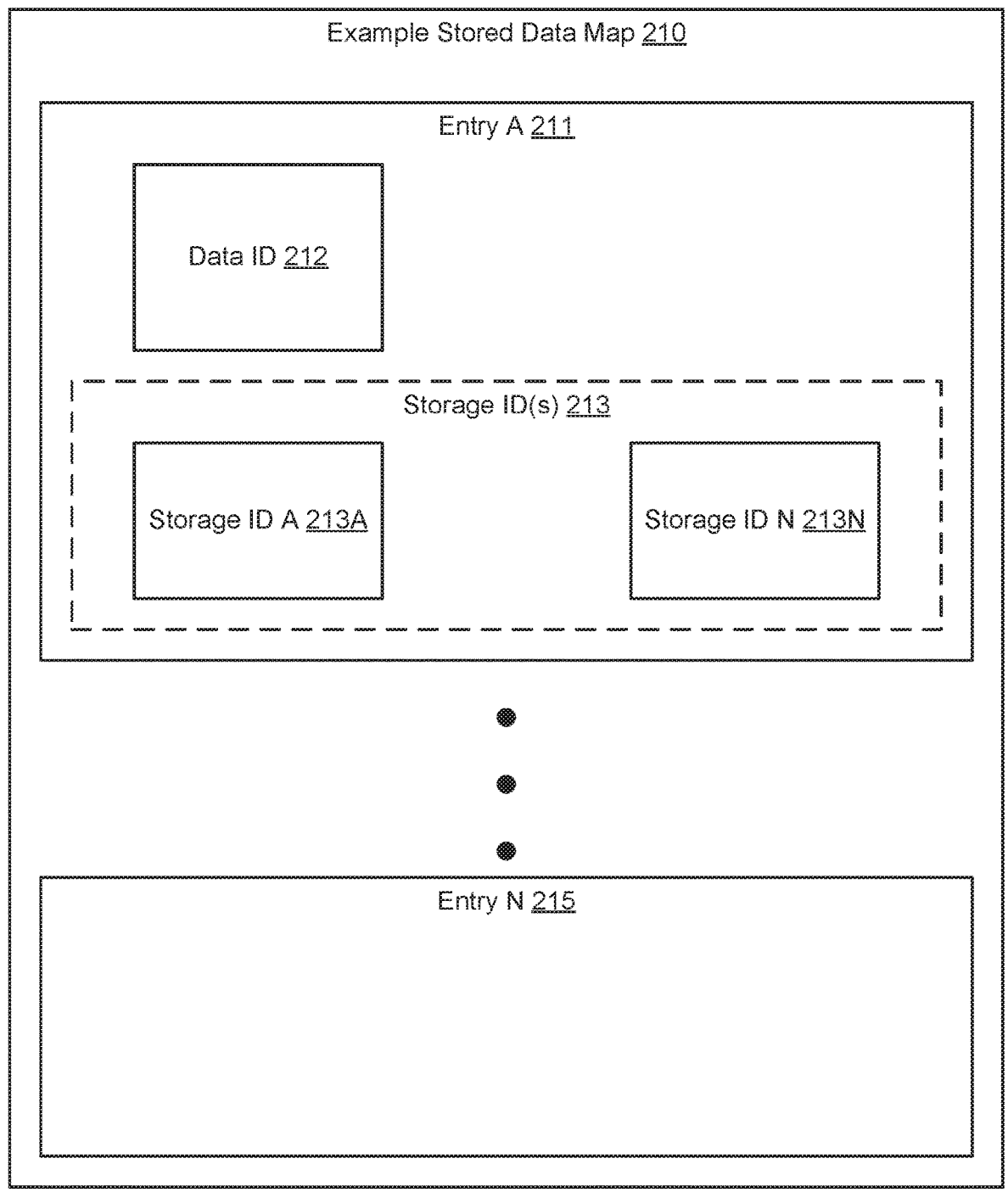
FIG. 2B shows a diagram of an example of a stored data map in accordance with one or more embodiments of the invention.

To further clarify embodiments of the invention, diagrams of data structures used by the system shown in FIG. 1A are illustrated in FIGS. 2A-2B.

FIG. 2A shows an example storage connections characteristics (200) in accordance with one or more embodiments of the invention. The aforementioned characteristics may be utilized by a storage gateway when selecting a storage from which to obtain data.

The example storage connections characteristics (200) may include entries (201, 205) associated with storage gateways. Each entry (201, 205) may include a storage identifier (202), a connection latency (203), and a connection bandwidth (204). The storage identifier (202) may include an identifier of a storage to which entry A (201) is associated. The connection latency (203) may specify the latency between: (i) the storage identified by the storage identifier (202) and a client which the storage gateway is serving, (ii) a client which the storage gateway is serving and the storage gateway, and/or (iii) the storage gateway and the storage identified by the storage identifier (202). The connection bandwidth (204) may specify the bandwidth between: (i) the storage identified by the storage identifier (202) and a client which the storage gateway is serving, (ii) a client which the storage gateway is serving and the storage gateway, and/or (iii) the storage gateway and the storage identified by the storage identifier (202). The example storage connections characteristics (200) may include any number of entries (201, 205) associated with any number of storages.

While illustrated as a list of entries, the example storage connections characteristics (200) may be stored in other formats, may be divided into multiple data structures, and/or include other information regarding connections of the system of FIG. 1A without departing from the invention.

FIG. 2B shows an example stored data map (210) in accordance with one or more embodiments of the invention. The aforementioned map may be utilized by a storage gateway when selecting a storage from which to obtain data.

The example stored data map (210) may include entries (211, 215) associated with portions of data and copies of the portions of data stored in any number of storages. Each entry (211, 215) may include a data identifier (212) and storage identifiers (213). The data identifier (212) may specify copies of data stored by one or more storages. The storage identifiers (213) may specify storages that store a copy of the data identified by the data identifier (212). The example stored data map (210) may include any number of entries (211, 215) associated with any number portions of data.

While illustrated as a list of entries, the example stored data map (210) may be stored in other formats, may be divided into multiple data structures, and/or include other information regarding the location of copies of data in the system of FIG. 1A without departing from the invention.

Figure 3:
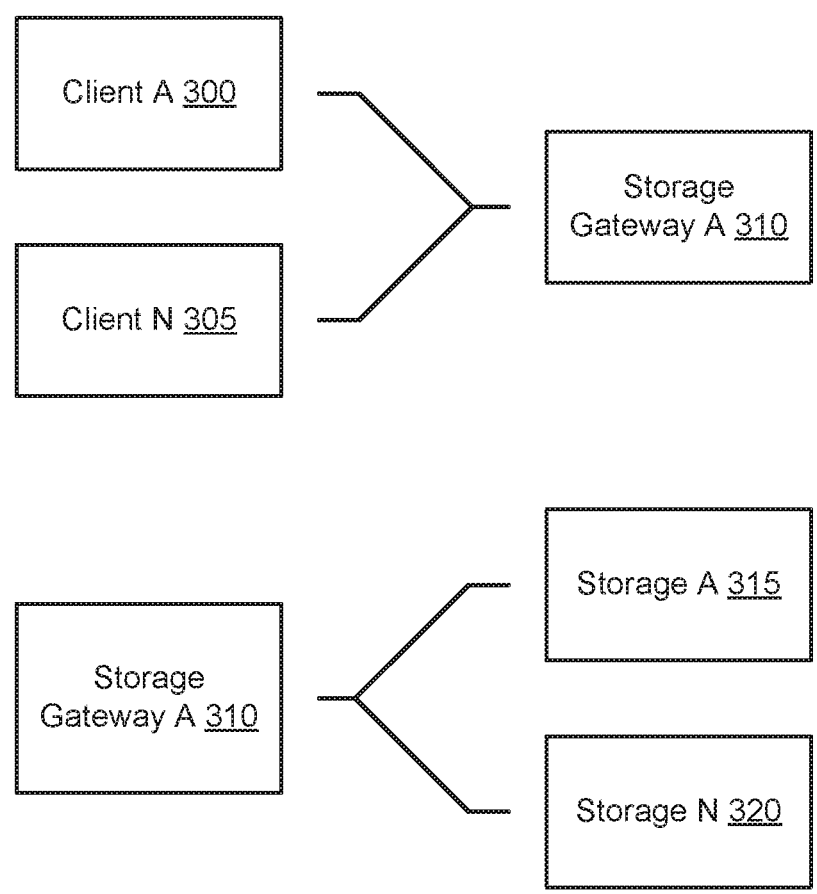
FIG. 3 shows a diagram of system relationships in accordance with one or more embodiments of the invention.

To further clarify relationships between components of the system of FIG. 1A, FIG. 3 shows a relationship diagram. As seen from the diagram, any number of clients (300, 305) may be served by a storage gateway (310), e.g., a N to one relationship. Similarly, a storage gateway (310) may utilize any number of storages (315, 320), e.g., a one to N relationship.

Figure 4A:
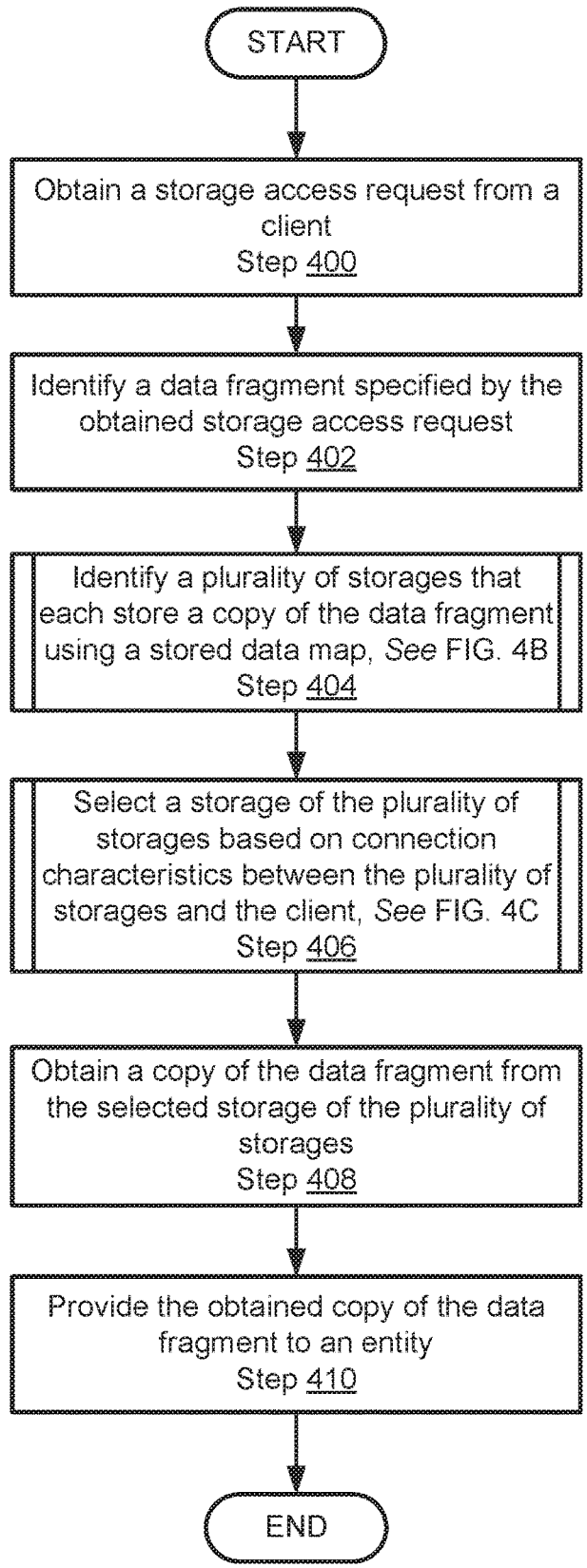
FIG. 4A shows a flowchart of a method of operating a storage gateway in accordance with one or more embodiments of the invention.

As discussed above, the storage gateway (110, FIG. 1A) may manage data from clients. FIGS. 4A-5 show methods in accordance with one or more embodiments of the invention to manage client data.

While illustrated as separate methods, each of the methods illustrated in FIGS. 4A-4D may be performed sequentially or in parallel (or a combination of both serial and parallel execution) without departing from the invention. Further, one of ordinary skill will appreciate that some or all of these steps may be executed in different orders, may be combined or omitted, and some or all of the steps may be executed in parallel.

FIG. 4A shows a flowchart of a method in accordance with one or more embodiments of the invention. The method depicted in FIG. 4A may be used to manage client data in accordance with one or more embodiments of the invention. The method shown in FIG. 4A may be performed by, for example, a storage gateway (110, FIG. 1A). Other component of the system illustrated in FIG. 1A may perform the method of FIG. 4A without departing from the invention.

In Step 400, a storage access request is obtained from a client. As used herein, a storage access request refers to a request for storing data or a request for obtaining stored data.

In Step 402, a data fragment that is specified by the obtained storage access request is identified.

In one or more embodiments of the invention, the data fragment is identified using a data fragment identifier included in the obtained storage access request. For example, the data access request may include a file name, or other data identifier, that implicitly references on or more data fragment identifiers. The implicitly referenced data fragment identifiers may identify data fragments that may be combined to include a file associated with the file name.

In Step 404, a plurality of storages that each store a copy of the identified data fragment are identified using a storage data map.

Figure 4B:
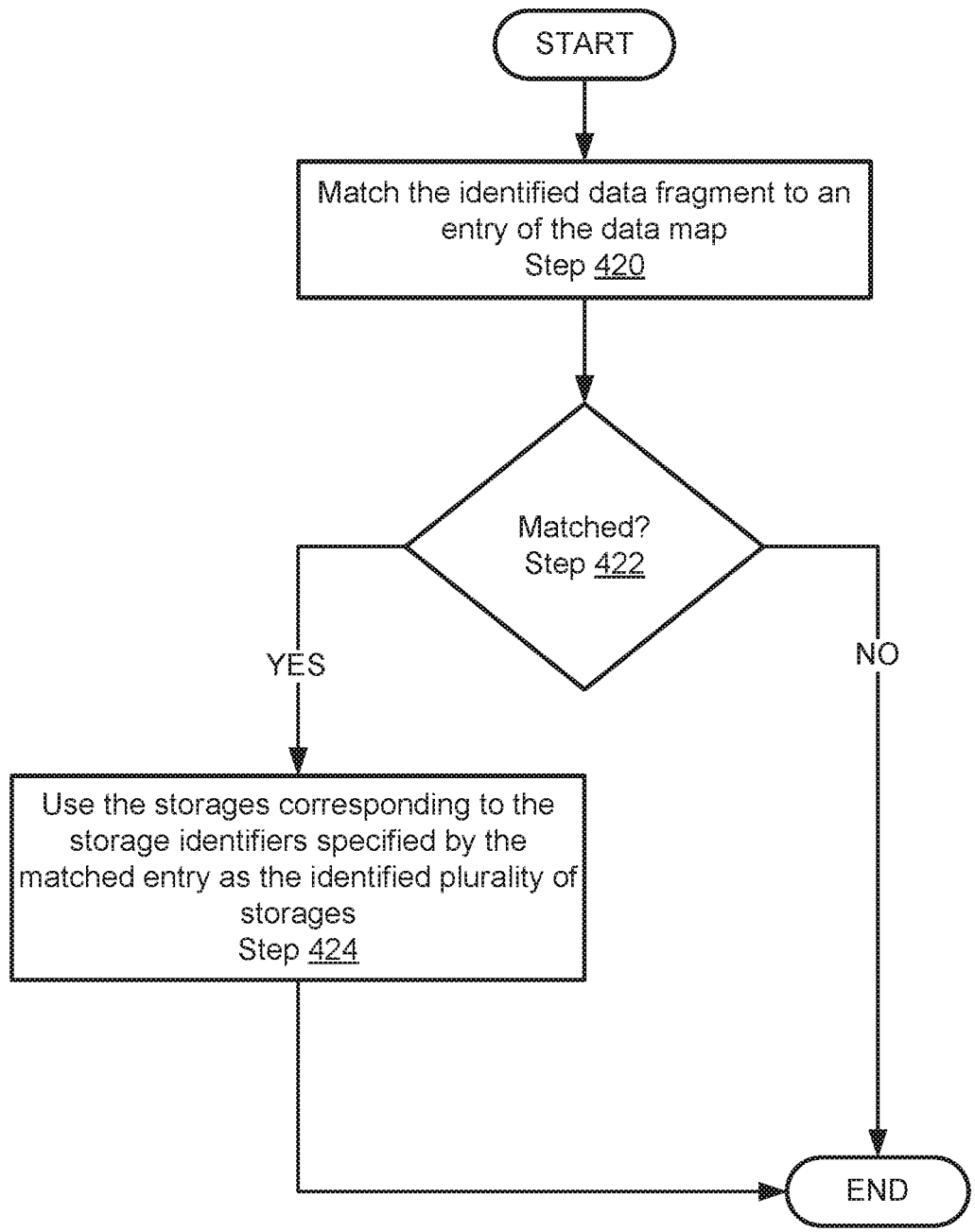
FIG. 4B shows a flowchart of a method of identifying storages that each store copies of a data fragment in accordance with one or more embodiments of the invention.
Figure 5:
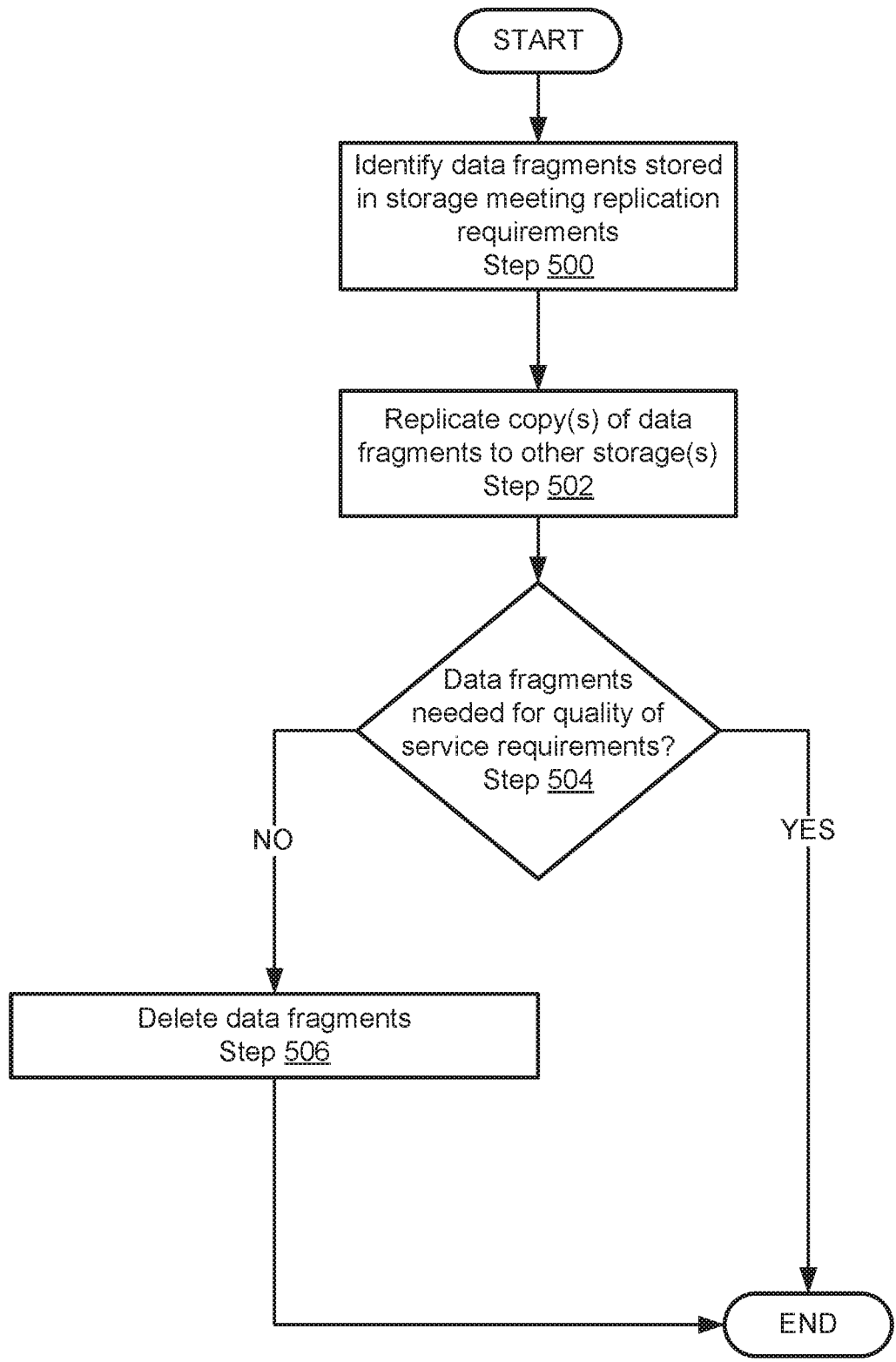
FIG. 5 shows a flowchart of a method of replicating data in accordance with one or more embodiments of the invention.

In one or more embodiments of the invention, the plurality of storages are identified via the method illustrated in FIG. 4B. The plurality of storages may be identified using other methods without departing from the invention.

In Step 406, a storage of the plurality of storages is selected based on connection characteristics between the plurality of storages and the clients.

Figure 4C:
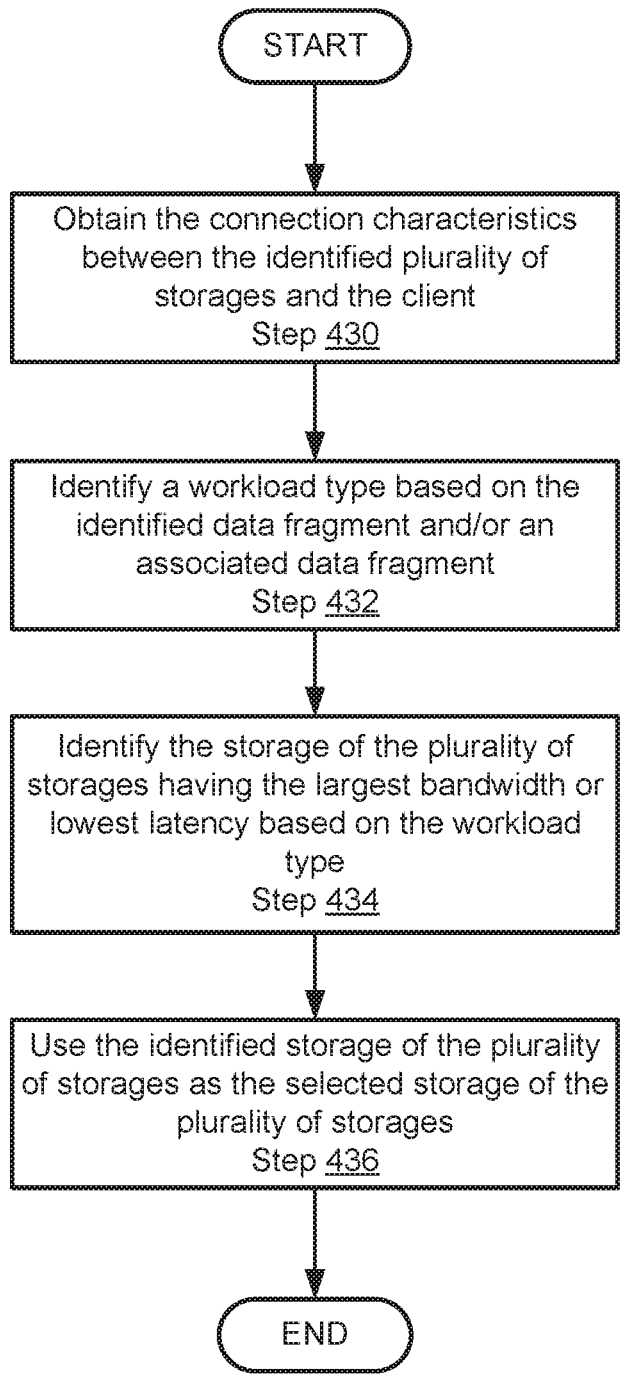
FIG. 4C shows a flowchart of a method of selecting a storage in accordance with one or more embodiments of the invention.

In one or more embodiments of the invention, the storage is selected via the method illustrated in FIG. 4C. The storage may be selected using other methods without departing from the invention.

In Step 408, a copy of the identified data fragment is obtained from the selected storage of the plurality of storages.

In one or more embodiments of the invention, the copy of the identified data fragment is obtained by sending a request to the selected storage. The request may specify the data fragment or an aggregation of data fragments. The aggregation of data fragments may be, for example, a file or other data structure that includes multiple data fragments. In response to the request, the selected storage may provide the data fragment or an aggregation of data fragments that includes a copy of the data fragment.

In Step 410, the obtained copy of the data fragment is provided to an entity.

In one or more embodiments of the invention, the entity is the client that sent the request of Step 400.

In one or more embodiments of the invention, the entity is a client that did not send the request of Step 400. For example, a first entity may send a request that results in the data fragment being provided to a second entity, e.g., a client that did not send a data access request.

The method may end following Step 410.

FIG. 4B shows a flowchart of a method in accordance with one or more embodiments of the invention. The method depicted in FIG. 4B may be used to identify a plurality of storages in accordance with one or more embodiments of the invention. The method shown in FIG. 4B may be performed by, for example, a storage gateway (110, FIG. 1A). Other component of the system illustrated in FIG. 1A may perform the method of FIG. 4B without departing from the invention.

In Step 420, the identified data fragment (e.g., Step 402, FIG. 4A) is matched to an entry of the data map.

In one or more embodiments of the invention, the data may specify a plurality of entries that each specify an identifier of a respective data fragment associated with the entry. In one or more embodiments of the invention, each entry of the plurality of entries is associated with a unique data fragment. In one or more embodiments of the invention, each entry of the plurality of entries is not associated with a unique data fragment. In other words, multiple entries may be associated with the same data fragment.

In one or more embodiments of the invention, the match may be performed by comparing the identified data fragment to identifiers of the entries. The match may be made based on the comparison. The comparison may be, for example, restricted to exact matches of data fragment identifiers of the entries to the identified data fragment.

In one or more embodiments of the invention, a single match is made. In other words, the identified data fragment may be only matched to a single entry.

In one or more embodiments of the invention, the identified data fragment may not be matched to any entry of the data map. Such a scenario may occur, for example, when a copy of the identified data segment is not being managed by a storage gateway and, thereby, a copy of the identified data segment has not been previously stored in a storage.

In Step 422, it is determined whether the identified data fragment was matched to an entry of the data map. If the identified data fragment was matched to an entry of the data map, the method proceeds to Step 424. If the identified data fragment was not matched to an entry of the data map, the method may end following Step 422.

In Step 424, the storages corresponding to the storage identifiers specified by the matched entry(s) of the data map are used as the identified plurality of storages (e.g., Step 404, FIG. 1A).

The method may end following Step 424.

FIG. 4C shows a flowchart of a method in accordance with one or more embodiments of the invention. The method depicted in FIG. 4C may be used to select a storage in accordance with one or more embodiments of the invention. The method shown in FIG. 4C may be performed by, for example, a storage gateway (110, FIG. 1A). Other component of the system illustrated in FIG. 1A may perform the method of FIG. 4C without departing from the invention.

In Step 430, the connection characteristics between the identified plurality of storages (e.g., Step 404, FIG. 4A) and the client that sent the request (e.g., Step 400, FIG. 4A) are obtained.

In one or more embodiments of the invention, the connection characteristics are one or more of the bandwidth or latency between: (i) the client and a storage gateway serving the client, (ii) the storage gateway serving the client and each storage of the identified plurality of storages, and (iii) the client and each storage of the identified plurality of storages.

In one or more embodiments of the invention, there may be multiple, alternate connections between the client, storage gateway, and identified plurality of storages. In such scenario, the characteristics may be specified as an aggregate of the parallel connections between the aforementioned components.

In Step 432, a workload type is identified based on the identified data fragment (e.g., Step 402, FIG. 1A) and/or an associated data fragment. In other words, multiple data fragments, each associated with a file type, may be use to identify a workload type.

In one or more embodiments of the invention, the workload type may be identified by matching the data fragment to a library of data fragments. The library may associate data fragment types with workload types. For example, the library may associate a data fragment that is a portion of a database file with a data base workload type. In a second example, the library may associate a data fragment that is a portion of a video file with an audio-vision workload type. The library may associate data fragments with any number of workload types at any level of granularity without departing from the invention.

In one or more embodiments of the invention, the workload type may be identified by matching the size of a file associated with the data fragment to a workload type. For example, a data fragment associated with a file between 0 and 1 megabyte in size may be associated with a first workload type. In a second example, a data fragment associated with a file between 1 and 10 megabyte in size may be associated with a second workload type.

In Step 434, the storage of the plurality of storages having the largest bandwidth and/or lowest latency is identified based on the obtained connection characteristics.

In one or more embodiments of the invention, the storage is identified by comparing the connection characteristics of each storage of the plurality of storages. The storage may be identified based on the comparison. In some embodiments of the invention, different methods of identifying the storage may be used. For example, the connection characteristics may be ranked from lowest latency to highest latency. In another example, the connection characteristics may be ranked from highest bandwidth to lowest latency. In still further embodiments of the invention, the storages may be ranked based on a composite score taking into account both bandwidth and latency. For example, the bandwidth and latency of each connection may be ranked and a composite rank for each connection may be established by averaging the bandwidth and latency rank of each respective connection.

In Step 436, the identified storage (e.g., Step 434) of the plurality of storages is used as the selected storage (e.g., Step 406, FIG. 4A) of the plurality of storages.

The method may end following Step 436.

As discussed above, in one or more embodiments of the invention storage gateways (e.g., 110, FIG. 1A) may migrate and/or makes copies of stored data to/in other storages. For example, data may be migrated from a first storage that has a high computing resource cost to a second storage that has a low computing resource cost. Doing so may decrease the computing resource cost of storing the data. In another example, a copy of data stored in a first storage may be made in a second storage to improve the reliability of providing the stored data in response to client requests. The first and second storage may be located at different geographic locations and, therefore, makes it less likely that both storages would be destroyed as a consequence of a natural disaster. The method shown in FIG. 5 may be performed to assist in accomplishing the aforementioned tasks or for other reasons.

FIG. 5 shows a flowchart of a method in accordance with one or more embodiments of the invention. The method depicted in FIG. 5 may be used to manage client data in accordance with one or more embodiments of the invention. The method shown in FIG. 5 may be performed by, for example, a storage gateway (110, FIG. 1A). Other component of the system illustrated in FIG. 1A may perform the method of FIG. 5 without departing from the invention.

In Step 500, data fragments stored in a storage that meets replication requirements is identified. As used herein, a replication requirement is a criteria for identifying data that will be replicated. The replication requirement may be any type of criteria.

For example, the replication criteria may be a storage age of the data. Data having a storage age, i.e., duration of storage in the storage, that is greater than a predetermined storage age may be selected as the replication requirement.

In another example, the replication criteria may be an owner of the data. Data that is owned by a predetermined owner, i.e., an entity that requested that the data be stored, may be selected as the replication requirement.

In a further example, the replication criteria may be a policy set by an owner of the data. The policy may specify a level of redundancy (i.e., number of copies), a level of geographic diversity (i.e., a distance between the locations where copies of the data are physically stored), a level of access speed (i.e., average time to provide the data in response to the request), or another criteria that may be used to identify data for replication.

The replication criteria may be other policies or rules for identifying data for replication without departing from the invention.

While the data is described herein as a data fragment, a data fragment may any amount or aggregation of data/files. For example, a data fragment may be a portion of a file, a data fragment may be all of a file, or a data fragment may be any aggregation of any number/portions of files.

In Step 502, copies of the identified data fragments are replicated in other storages. The copies of the identified data fragments may be replicated to the other storages by sending a copy of the data fragments to the other storages for storage.

The other storages may be any of the storages used by storage gateways to store data. The other storages may be selected using any criteria without departing from the invention.

In some embodiments of the invention, the other storages may be selected based on quality of storage service requirements specified by the client that stored the data. For example, the client that stored the data may specify the relative quality of storage service for the data over time and when the data is identified in Step 500 storages meeting the quality of storage service requirements may be selected for storing copies of the data. Different data fragments may be associated with different quality of storage service requirements and, therefore, copies of the data fragments may be stored in different storages of the other storages.

In Step 504, it is determined whether the identified data fragments of Step 500 are needed to meet quality of storage service requirements. For example, a client may specify a level of redundancy as a quality of storage service requirement. To meet the level of redundancy storage service requirement, one or more of the identified data fragments may be required to meet the redundancy storage service requirement.

In one or more embodiments of the invention, the identified data fragments may be determined as being needed for quality of storage service requirements by comparing each, or portion thereof, of the identified data fragments and the replicated copies to quality of storage service requirements. As discussed above, the quality of storage service requirements may be specified by a client that stored the data.

If the identified data fragments are determined as being needed for quality of service requirements, the method may end following Step 504. If the identified data fragments are determined as not being needed for quality of service requirements, the method proceeds to Step 506.

In Step 506, the identified data fragments are deleted. The, in Step 506, the data fragments that were identified for replication may be deleted while the replicated, e.g., copies, data fragments may continue to be stored in the storages.

The method may end following Step 506.

Figure 6A:
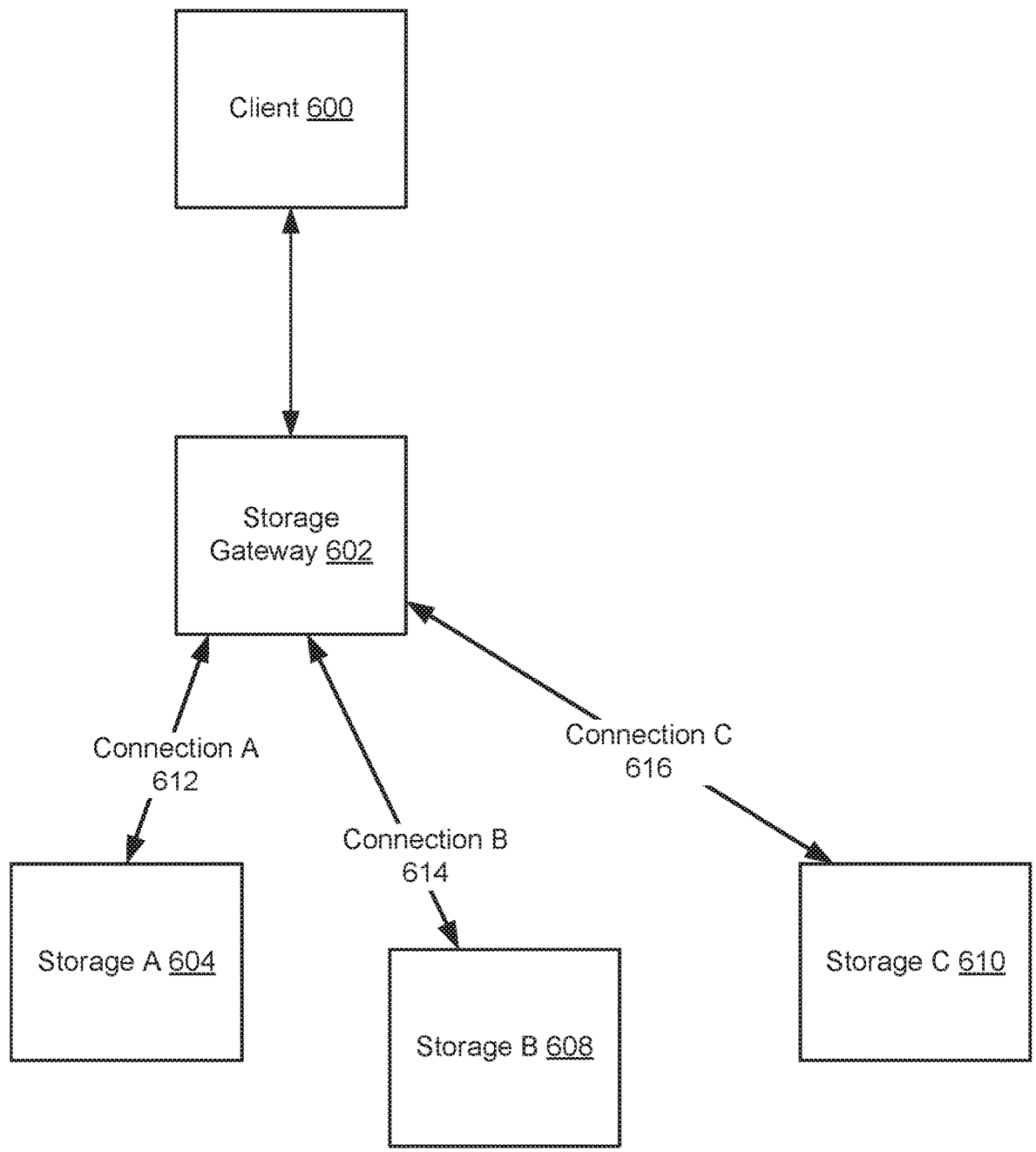
FIG. 6A shows a diagram of an example system.
Figure 6B:
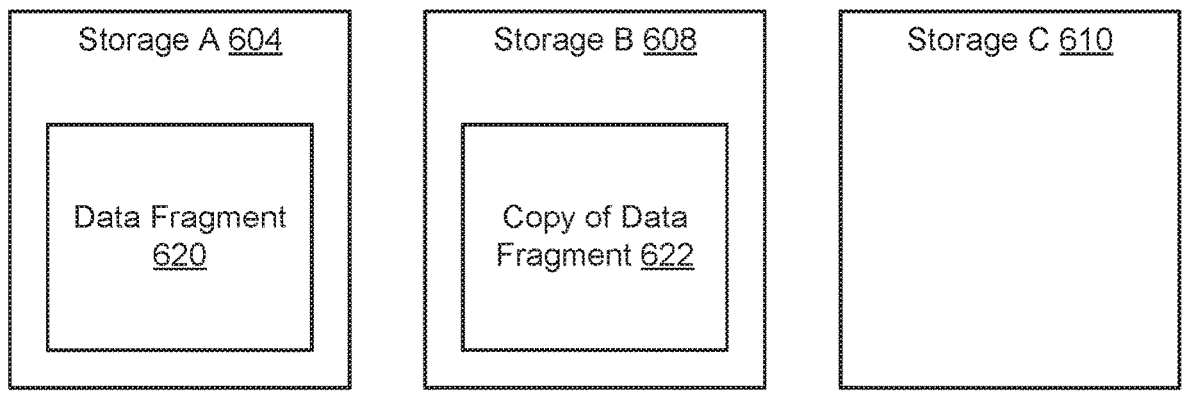
FIG. 6B shows a diagram of example data stored by the storages of the example system of FIG. 6A at a first time.
Figure 6C:
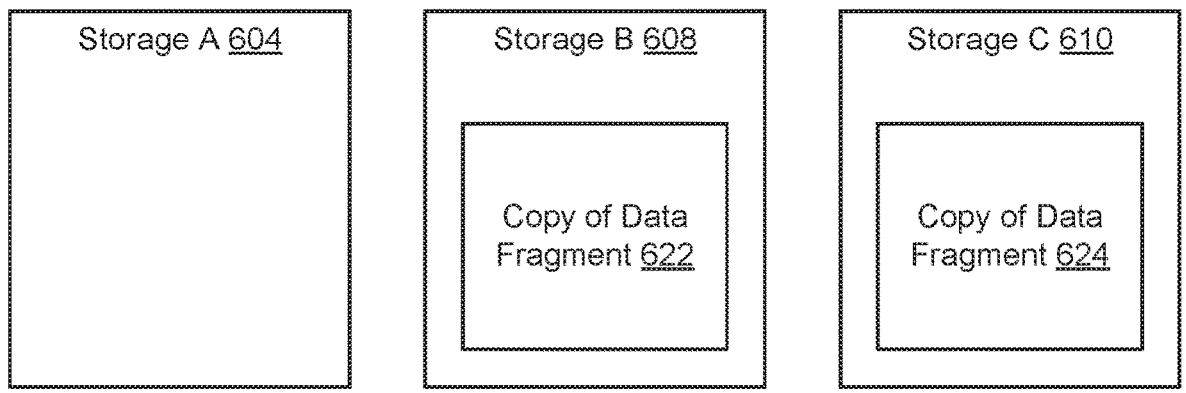
FIG. 6C shows a diagram of example data stored by the storages of the example system of FIG. 6A at a second time.

To further explain embodiments of the invention, a non-limiting example is shown in FIGS. 6A-6C.

Example 1

FIG. 6A shows a diagram of a topology of an example system. The system includes a client (600) operably connection to three storages (604, 608, 610) via a storage gateway (602). The three storages (604, 608, 610) are operably connected to the storage gateway (602) via three separate operable connections (612, 614, 616). While each storage is illustrated as only being connected to the storage gateway (602) via a single respective connections, each storage may be connected by any number of storages to the storage gateway (602). The connections (612, 614, 616) illustrated in FIG. 6A represent the aggregate capabilities of the various physical connections.

Each of the storages provides different qualities of storage service. Storage A (604) provides the highest quality of storage service and consumes the largest quantity of computing resources to provide the highest quality of storage service. Storage B (608) provides a mid-level quality of storage service and consumes a moderate quantity of computing resources to provide the mid-level quality of storage service. Storage C (610) provides a low quality of storage service and consumes a low quantity of computing resources to provide the low quality of storage service.

At a first point in time, the client (600) requests that a data fragment be stored. The client sends the request to the storage gateway (602). The client additionally specifies a quality of storage service requirement for the data that requires a redundancy level of two, i.e., at least two copies of the data being stored. In response to the request, the storage gateway (602) may store the data fragment in storage A (604).

FIG. 6B shows a diagram illustrating the data stored in the various storages of the system illustrated in FIG. 6A at a second point in time. Between when the data was originally-stored in storage A (604) and the second point in time, the storage gateway (602) replicated a copy of the data fragment (622) in storage B (608). Replicating the copy of the data fragment improves the reliability of providing the client access to the data in the future and meets the redundancy level of two specified by the client. Thus, the original-stored data fragment (620) was not deleted prior to the second point in time.

FIG. 6C shows a diagram illustrating the data stored in the various storages of the system illustrated in FIG. 6A at a third point in time. Between when the copy of the data fragment (622) was replicated in storage B (608) and the third point in time, the storage gateway (602) replicated a second copy of the data fragment (624) in storage C (610). Since the client only requires a redundancy level of two for the data, the storage gateway deleted the originally-stored data fragment from storage A (604). Deleting the originally-stored data fragment from storage A (604) reduces the computing resource cost of storing the data fragment while meeting the quality of storage service requirement imposed by the client.

Example 1 ends here.

Figure 7:
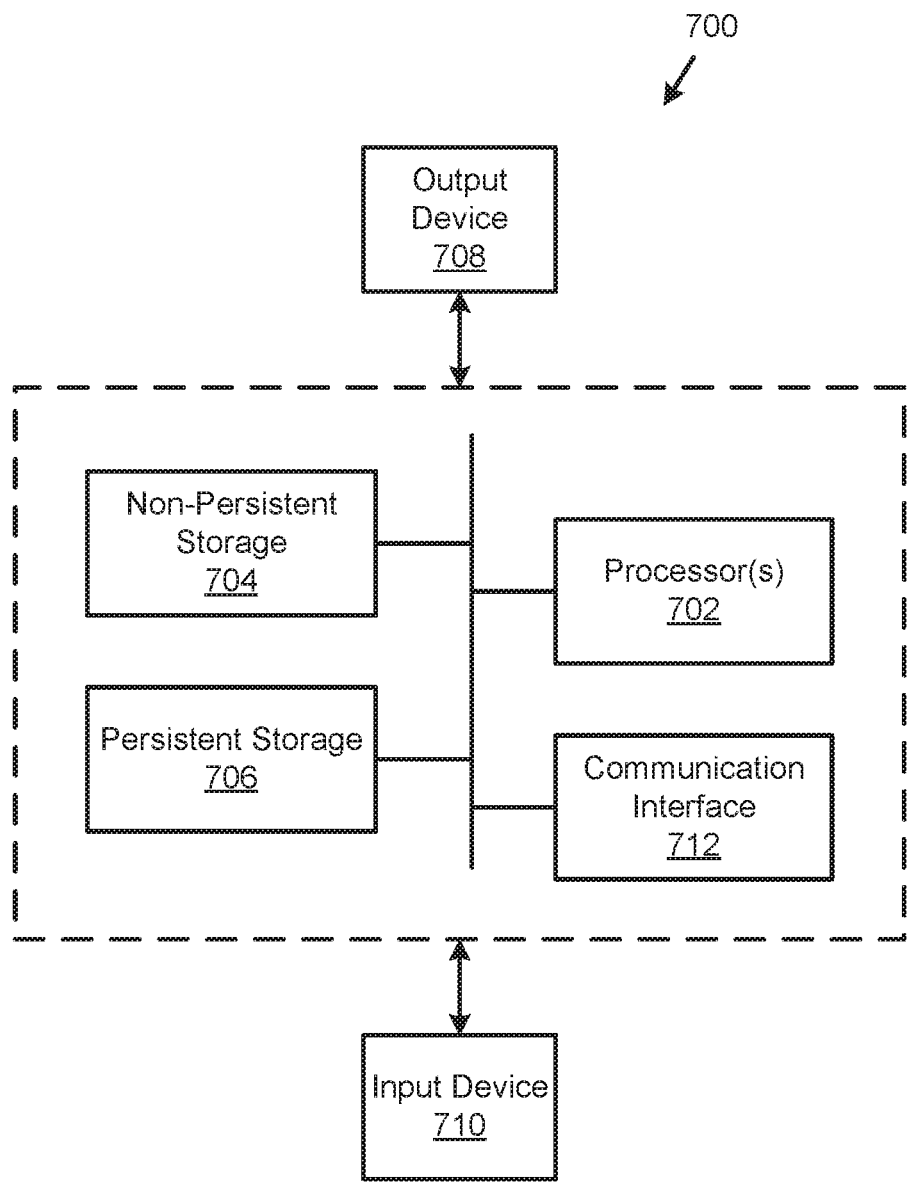
FIG. 7 shows a diagram of a computing device in accordance with one or more embodiments of the invention.

As discussed above, embodiments of the invention may be implemented using a computing device. The system of FIG. 1A may utilize any number of computing devices to provide the functionality described throughout this application. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

One or more embodiments of the invention may address the problem of providing data in a networked environment having a topology that changes over the life of the data. For example, the topology of a network that supplies data to clients may change over time. Unlike traditional computing devices (e.g., desktop computers) that generally have a fixed amount of unshared storage, a network that stores data may change dynamically. Additionally, the connections between components of the network may also change, e.g., the bandwidth or latency of each connection may change over time. Still further, in a networked environment multiple copies of data may be stored in multiple locations to provide a desired level reliability of accessing the data. To provide previously stored data in a networked environment, embodiments of the invention provide a method of dynamically identifying a data source within a network environment from which to obtain a copy of the data. The data source may not exist at the time the data is originally-stored in the network environment and, therefore, the identity of the provider may not be ascertainable at the time of storing the data. Embodiments of the invention may address the aforementioned problem by dynamically analyzing the topology of the network using a set of rules that predict the ability of each potential data source to provide the requested data. A data source may then be selected based on the predicted ability of each of the potential data sources.

The aforementioned problem is uniquely encountered due to the technological environment in which networked storage operates. Due to the rise of geographically distributed storages, client data is frequently store data in storages that vary in location and quality of connection to the clients. Unlike traditional internal storages of desktop computers, the quality of storage service provided by remote storages depends on characteristics of the connection between the client and the. Embodiments of the invention may take into account the connection characteristics that limit the ability of storages to provide previously stored data. Thus, embodiments of the invention dynamically determine the ability of storages to provide data to clients and make selections based on the dynamic characterizations.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may enable one or more of the following: i) improve a quality of storage service provided to clients by reducing the likelihood of a failure to provide data, ii) reduce the computing resource cost of obtaining previously stored data by reducing the likelihood of needing to resend data due to data transmission failures, and iii) reduce a cognitive burden on a user by dynamically monitoring a state of a network in which data is stored and automatically selecting a storage from which to retrieve stored data without user intervention.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A storage gateway for providing stored data, comprising:
    a persistent storage comprising a stored data map and a data fragment library; and
    a processor programmed to:
        obtain a data storage access request from a client;
        identify a data fragment specified by the data storage access request;
        identify a plurality of storages that each store a copy of the data fragment using the stored data map;
        identify, using the data fragment library, a workload type associated with the data fragment, wherein the workload type corresponds to a type of file associated with the data fragment;
        obtain a plurality of connection characteristics between the plurality of storages and the client;
        identify, based on the workload type, a first connection characteristic of the plurality of connection characteristics;
        select a first storage of the plurality of storages, wherein the first connection characteristic is between the client and the first storage; and
        obtain the copy of the data fragment from the first storage.

2. The storage gateway of claim 1, wherein the plurality of connection characteristics specify a bandwidth of respective connections between each of the plurality of storages and the client.

3. The storage gateway of claim 1, wherein the plurality of connection characteristics specify a latency of respective connections between each of the plurality of storages and the client.

4. The storage gateway of claim 1, wherein the processor is further programmed to:
    before obtaining the data storage access request:
        obtain a data storage request for the data fragment; and
        store, in response to the data storage request, a first copy of the data fragment in the first storage of the plurality of storages.

5. The storage gateway of claim 4, wherein the processor is further programmed to:
    store a second copy of the data fragment in a second storage of the plurality of storages.

6. The storage gateway of claim 5, wherein the plurality of connection characteristics specify that the first storage has lower latency to the client than the second storage.

7. The storage gateway of claim 5, wherein the plurality of connection characteristics specify that the first storage has greater bandwidth to the client than the second storage.

8. The storage gateway of claim 1, wherein the processor is further programmed to:
    delete the data fragment from the first storage of the plurality of storages; and
    after deleting the data fragment from the first storage:
        obtain a second data storage access request from a second client;
        identify a second data fragment specified by the second data storage access request;
        identify a second plurality of storages that each store a copy of the second data fragment using the stored data map;
        select a second storage of the second plurality of storages based on a second plurality of connection characteristics between the second plurality of storages and the second client when the second data storage access request is obtained; and
        obtain the copy of the second data fragment from the second storage.

9. The storage gateway of claim 1, wherein each storage of the plurality of storages is a separate cloud storage.

10. The storage gateway of claim 1, wherein the plurality of storages are connected to the storage gateway via operable connections.

11. The storage gateway of claim 10, wherein the operable connections comprise the Internet.

12. The storage gateway of claim 1, wherein the plurality of storages are geographically separated from the storage gateway.

13. The storage gateway of claim 1, wherein the first connection characteristic is identified based on a comparison of each connection characteristic of the plurality of connection characteristics.

14. The storage gateway of claim 13, wherein the first connection characteristic is best optimized for the workload type among the plurality of connection characteristics.

15. A method of operating a storage gateway for providing stored data, comprising:
    obtaining a data storage access request from a client;
    identifying a data fragment specified by the data storage access request;
    identifying a plurality of storages that each store a copy of the data fragment using a stored data map;
    identifying, in a data fragment library, a workload type associated with the data fragment, wherein the workload type corresponds to a type of file associated with the data fragment;
    obtaining a plurality of connection characteristics between the plurality of storages and the client;
    identifying, based on the workload type, a first connection characteristic of the plurality of connection characteristics;
    selecting a first storage of the plurality of storages, wherein the first connection characteristic is between the client and the first storage; and
    obtaining the copy of the data fragment from the first storage.

16. The method of claim 15, further comprising:
delete the data fragment from the first storage of the plurality of storages; and
after deleting the data fragment from the first storage:
- obtaining a second data storage access request from a second client;
- identifying a second data fragment specified by the second data storage access request;
- identifying a second plurality of storages that each store a copy of the second data fragment using the stored data map;
- selecting a second storage of the second plurality of storages based on a second plurality of connection characteristics between the second plurality of storages and the second client when the second data storage access request is obtained; and
- obtaining the copy of the second data fragment from the second storage.

17. A non-transitory computer readable medium comprising computer readable program code, which when executed by a computer processor enables the computer processor to perform a method for operating a storage gateway for providing stored data, the method comprising:
- obtaining a data storage access request from a client;
- identifying a data fragment specified by the data storage access request;
- identifying a plurality of storages that each store a copy of the data fragment using a stored data map;
- identifying, in a data fragment library, a workload type associated with the data fragment, wherein the workload type corresponds to a type of file associated with the data fragment;
- obtaining a plurality of connection characteristics between the plurality of storages and the client;
- identifying, based on the workload type, a first connection characteristic of the plurality of connection characteristics;
- selecting a first storage of the plurality of storages, wherein the first connection characteristic is between the client and the first storage; and
- obtaining the copy of the data fragment from the first storage.

18. The non-transitory computer readable medium of claim 17, wherein the method further comprises:
delete the data fragment from the first storage of the plurality of storages; and
after deleting the data fragment from the first storage:
- obtaining a second data storage access request from a second client;
- identifying a second data fragment specified by the second data storage access request;
- identifying a second plurality of storages that each store a copy of the second data fragment using the stored data map;
- selecting a second storage of the second plurality of storages based on a second plurality of connection characteristics between the second plurality of storages and the second client when the second data storage access request is obtained; and
- obtaining the copy of the second data fragment from the second storage.

\* \* \* \* \*